United States Patent
Zhu et al.

(10) Patent No.: US 8,836,902 B2
(45) Date of Patent: Sep. 16, 2014

(54) TFT-LCD, MANUFACTURING METHOD AND DRIVING METHOD THEREOF

(75) Inventors: Jianlei Zhu, Beijing (CN); Xiaoling Xu, Beijing (CN); Jaegeon You, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 168 days.

(21) Appl. No.: 13/284,216

(22) Filed: Oct. 28, 2011

(65) Prior Publication Data

US 2012/0105754 A1    May 3, 2012

(30) Foreign Application Priority Data

Oct. 29, 2010  (CN) .......................... 2010 1 0532017

(51) Int. Cl.
*G02F 1/1343* (2006.01)
*G02F 1/1335* (2006.01)
*G02F 1/139* (2006.01)

(52) U.S. Cl.
CPC ........ *G02F 1/133512* (2013.01); *G02F 1/1396* (2013.01); *G02F 1/134363* (2013.01); *G02F 2001/134345* (2013.01); *G02F 2001/134381* (2013.01)
USPC .......................................... 349/141; 349/139

(58) Field of Classification Search
CPC combination set(s) only.
See application file for complete search history.

(56) References Cited

U.S. PATENT DOCUMENTS

| | | | |
|---|---|---|---|
| 6,147,666 A | 11/2000 | Yaniv | |
| 2004/0227881 A1 | 11/2004 | Okazaki et al. | |
| 2008/0129901 A1* | 6/2008 | You et al. ........................ | 349/33 |

FOREIGN PATENT DOCUMENTS

| | | |
|---|---|---|
| CN | 1527101 A | 9/2004 |
| CN | 1975573 A | 6/2007 |
| CN | 101546733 A | 9/2009 |
| CN | 102262322 A | 11/2011 |

OTHER PUBLICATIONS

First Chinese Office Action dated Sep. 13, 2013; Appln No. 201010532017.3.
Second Chinese Office Action dated Apr. 15, 2014; Appln. No. 201010532017.3.

* cited by examiner

*Primary Examiner* — Richard Kim
(74) *Attorney, Agent, or Firm* — Ladas & Parry LLP

(57) ABSTRACT

Embodiments of the disclosed technology provide a TFT-LCD and manufacturing method and driving method thereof. The TFT-LCD comprises a color filter substrate, an array substrate, and a liquid crystal layer sandwiched between the color filter substrate and the array substrate. A first strip-like electrode and a second strip-like electrode are formed in the area of a black matrix on the color filter substrate, an area surrounded by the first strip-like electrode and the second strip-like electrode comprises at least one sub-pixel area, and the first strip-like electrode and second strip-like electrode are electrically insulated from each other.

9 Claims, 5 Drawing Sheets

TFT-LCD, MANUFACTURING METHOD AND DRIVING METHOD THEREOF

BACKGROUND

Embodiments of the disclosed technology relates to a thin film transistor liquid crystal display (TFT-LCD) and a manufacturing method and a driving method thereof.

A Liquid crystal panel comprises a color filter substrate, an array substrate and a liquid crystal layer sandwiched between the two substrates. A transparent electrode is provided on the color filter substrate and a pixel electrode for each pixel unit is provided on the array substrate. The voltage difference formed between the transparent electrode and the pixel electrode can drive liquid crystal molecules in the liquid crystal layer to deflect.

FIG. 1a shows one mode of arrangement of liquid crystal molecules in a conventional technology, and FIG. 1b shows another mode of arrangement of liquid crystal molecules in another conventional technology. FIGS. 1a and 1b show the arrangement of liquid crystal molecules in a TN-type liquid crystal display. The voltage difference formed between the transparent electrode on the color filter substrate and the pixel electrode on the array substrate is referred to as "VLC." When VLC is zero, under the action of alignment layers, the liquid crystal molecules close to the alignment layers are arranged in the rubbing direction. The rubbing direction of alignment layer on the color filter substrate presents an angle of 90 degree with respect to the rubbing direction of the alignment layer on the array substrate. Therefore, the liquid crystal molecules are arranged on the color filter substrate and the array substrate spirally, as shown in FIG. 1a. At this time, the liquid crystal panel displays a white picture. When VLC is not zero, the liquid crystal molecules deflect under the action of VLC, as shown in FIG. 1b. At this time, the liquid crystal panel displays a black picture.

During the liquid crystal panel is changed from a black picture (i.e., lowest grey scale) to a white picture (i.e., highest grey scale), the light transmission ratio of the liquid crystal layer rises from 10% to 90%. This period of time is referred to as rise time (Ton). During the liquid crystal panel is changed from a white picture to a black picture, the light transmission ratio falls from 90% to 10%. This period of time is referred to as fall time (Toff). The response time of the liquid crystal panel is the sum of Ton and Toff. FIG. 2 is a relationship view between the rise time and fall time and the light transmission ratio in a conventional technology, in which the x-coordinate is time "t" and the y-coordinate is transmission ratio "Tr."

For a liquid crystal panel, in theory, short response time is better. However, in actual applications, the liquid crystal panel usually has relatively long response time due to the impact of many factors, such as rotation viscosity, elasticity coefficient, thickness, temperature and driving means etc. If the response time is significantly long, the effect of display would be impacted severely.

SUMMARY

According to one aspect of the disclosed technology, a thin film transistor liquid crystal display (TFT-LCD), comprising: a color filter substrate, an array substrate, and a liquid crystal layer sandwiched between the color filter substrate and the array substrate, wherein a first strip-like electrode and a second strip-like electrode are formed in the area of a black matrix on the color filter substrate, an area surrounded by the first strip-like electrode and the second strip-like electrode comprises at least one sub-pixel area, and the first strip-like electrode and second strip-like electrode are electrically insulated from each other.

According to another aspect of the disclosed technology, a manufacturing method of a thin film transistor liquid crystal (TFT-LCD) comprising a color filter substrate, comprising a step of forming the color filter substrate, the step in turn comprising forming a first strip-like electrode and a second strip-like electrode in an area of a black matrix on a base substrate of the color filter substrate. An area surrounded by the first strip-like electrode and the second strip-like electrode comprises at least one sub-pixel area, and the first strip-like electrode and second strip-like electrode are electrically insulated from each other.

According to further another aspect of the disclosed technology, a driving method of the TFT-LCD described above is provided. The driving method comprises: applying signals on the first strip-like electrode and the second strip-like electrode signal after the thin film transistor of the sub-pixel area is turned on and before a data signal is applied on the pixel electrode of the sub-pixel area, such that a horizontal electric field is formed between the first strip-like electrode and the second strip-like electrode; and stopping signals on the first strip-like electrode and the second strip-like electrode after the data signal is applied on the pixel electrode and before the thin film transistor of the sub-pixel area is turned off.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

In order to make the purpose, the technical solutions and the advantages of the disclosed technology more clearly, the technical solutions in the embodiments of the disclosed technology will be described clearly and integrally below in conjunction with the drawings in the embodiments of the disclosed technology, and it is obviously that the described embodiments are a part of the embodiments of the disclosed technology, but not all of them. Based on the embodiments in the disclosed technology, all the other embodiments achieved by those skilled in the art on the precondition of no creative work being done belong to the protection scope of the disclosed technology.

Figure 3:
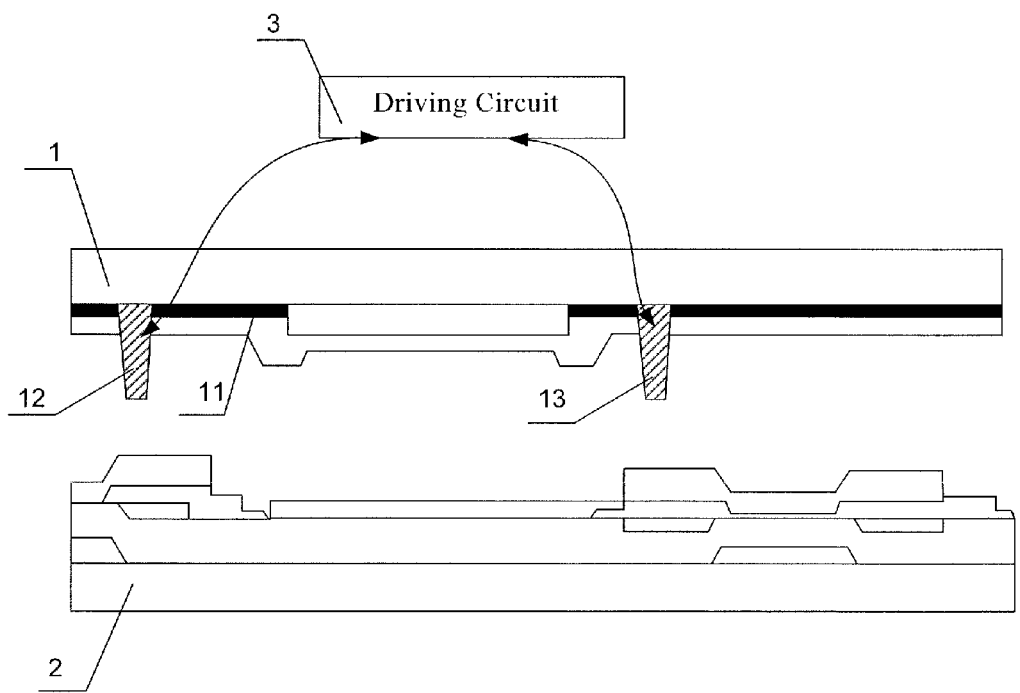
FIG. 3 is a schematic structural view of a TFT-LCD according to the embodiment of the disclosed technology.

FIG. 3 is a schematic structural view of a TFT-LCD of an embodiment of the disclosed technology. The TFT-LCD comprises a color filter substrate 1 and an array substrate 2, with a liquid crystal layer sandwiched between the color filter substrate 1 and the array substrate 2. A black matrix 11 is formed on the color filter substrate 1, and a first strip-like electrode 12 and a second strip-like electrode 13 is formed in the area of the black matrix 11, for example, in or on the black matrix 11. The area surrounded by the first strip-like electrode 12 and the second strip-like electrode 13 comprises at least one sub-pixel area. The first strip-like electrode 12 and the second strip-like electrode 13 are electrically insulated from each other.

In FIG. 3, as an example, the first strip-like electrode 12 and the second strip-like electrode 13 are provided as projecting from other members on the color filter substrate 1. But, the disclosed technology is not limited to this, and the first strip-like electrode 12 and the second strip-like electrode 13 may also be provided as not projecting from or only projecting from a part of other members on the color filter substrate 1.

Figure 4:
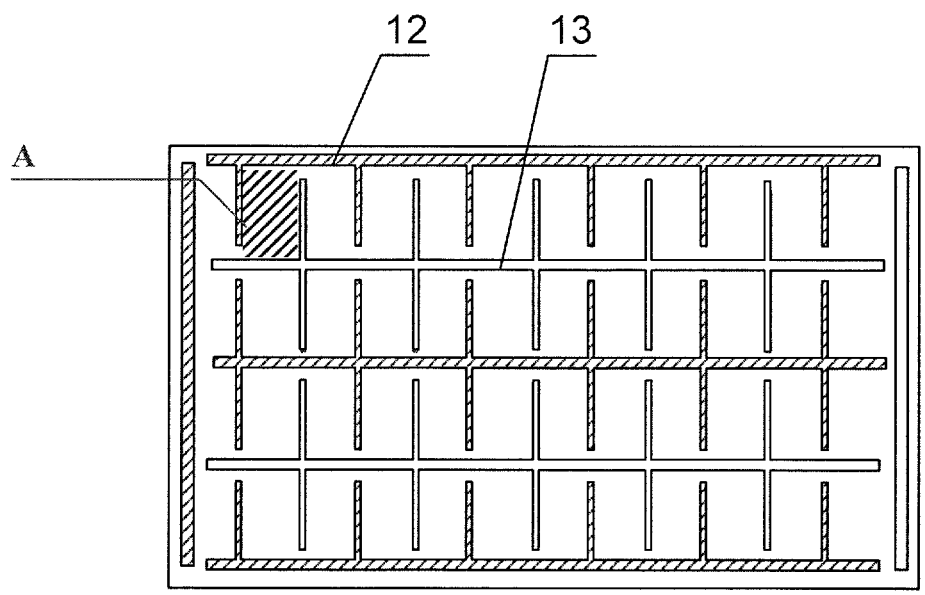
FIG. 4 is a schematic plane view of a color filter substrate in FIG. 3.

FIG. 4 is a schematic plane view of a color filter substrate in FIG. 3. In FIG. 4, the first strip-like electrode 12 comprises a main portion and a plurality of branch portions extending from the main portion, and the second strip-like electrode 13 also comprises a main portion and a plurality of branch portion extending from the main portion. The main portion of the first strip-like electrode 12 and the main portion of the second strip-like electrode 13 are parallel to each other and provided alternatively in the longitudinal direction in the drawing, and the branch portions of the first strip-like electrode 12 and the branch portions of the second strip-like electrode 13 are parallel to each other and are provided alternatively in the horizontal direction in the drawing. A block area surrounded by the first strip-like electrode 12 and the second strip-like electrode 13 comprises at least one sub-pixel area. Generally, one pixel area comprises three sub-pixel areas of red, green and blue respectively. The block area surrounded by the first strip-like electrode 12 and the second strip-like electrode 13 may comprise one sub-pixel area only, or may also comprise three sub-pixel area, i.e., one pixel area. The block area surrounded by the first strip-like electrode 12 and the second strip-like electrode 13 may comprise more sub-pixel areas, i.e., the arrangement of the first strip-like electrode 12 and the second strip-like electrode 13 can be relatively sparse.

The TFT-LCD shown in FIG. 3 may also comprise a driving circuit 3 which is connected with the first strip-like electrode 12 and the second strip-like electrode 13 for applying signals to the first strip-like electrode 12 and the second strip-like electrode 13 after the thin film transistor of the sub-pixel area is turned on and before a data signal is applied on the pixel electrode, such that a horizontal electric field is formed between the first strip-like electrode 12 and the second strip-like electrode 13.

This driving circuit 3 may also be used for stopping signals applied on the first strip-like electrode 12 and the second strip-like electrode 13 after the data signal is applied on the pixel electrode and before the thin film transistor of the sub-pixel area is turned off.

The working principle of the TFT-LCD according to the embodiment of the disclosed technology will be introduced in detail below.

Figure 1A:
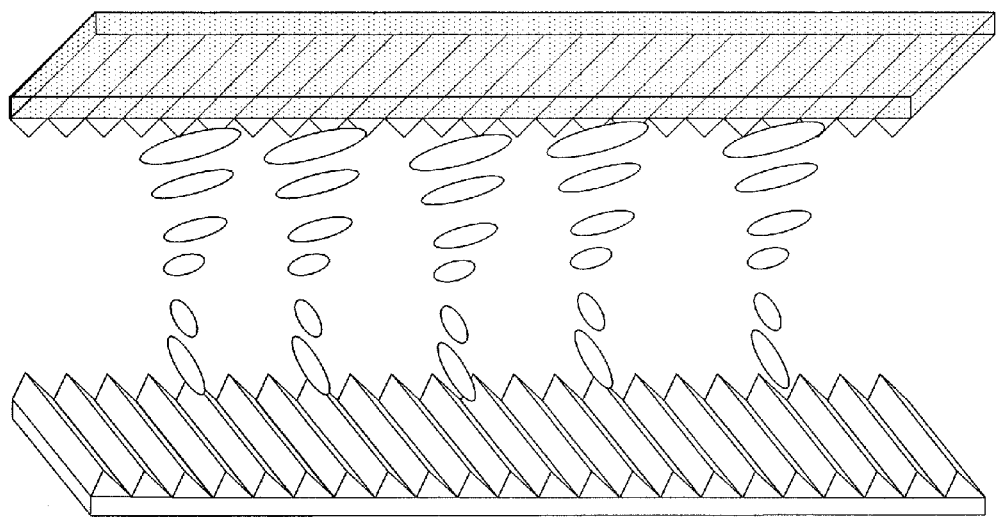
FIG. 1a shows a mode of arrangement of liquid crystal molecules in a conventional technology.
Figure 1B:
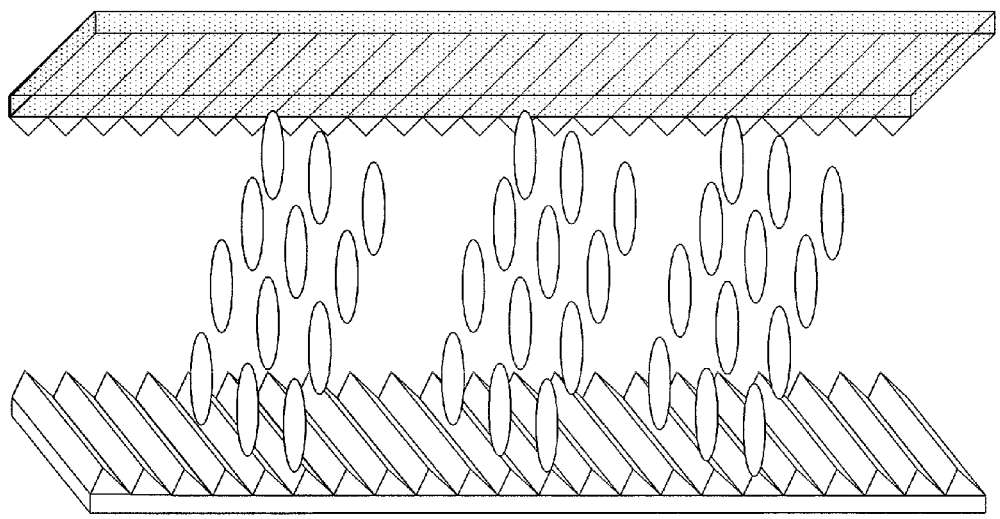
FIG. 1b shows another mode of arrangement of liquid crystal molecules in a conventional technology.
Figure 2:
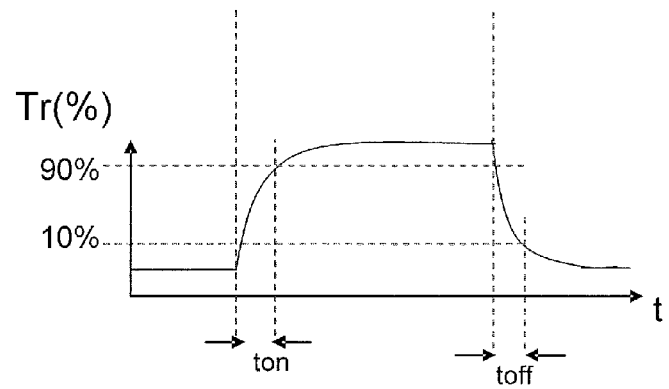
FIG. 2 is a relationship view of rise time and fall time and transmission ratio of the light of a liquid crystal panel in a conventional technology.

In a TN-type TFT-LCD, liquid crystal molecules change from the state as shown in FIG. 1b to the state as shown in FIG. 1a within the time "Ton" for the liquid crystal display being changed from a black picture to a white picture. Liquid crystal molecules change from the state as shown in FIG. 1a to the state as shown in FIG. 1b within the time "Toff" for the liquid crystal display being changed from a white picture to a black picture. Ton and the Toff are associated with many factors, such as rotation viscosity, elasticity coefficient, thickness, temperature and driving means etc.

Figure 5:
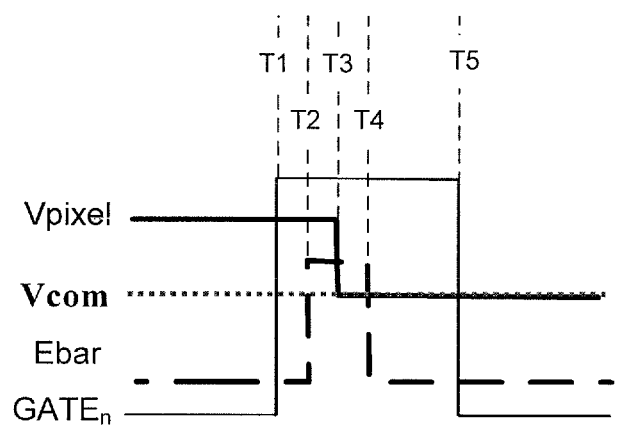
FIG. 5 is a sequence chart of each signal in the embodiment of the disclosed technology.

The impact on Ton by the horizontal electric field formed between the first strip-like electrode 12 and the second strip-like electrode 13 will be analyzed with reference to FIG. 5.

FIG. 5 is a sequence chart of each signal in the embodiment of the disclosed technology. $GATE_n$ is a drive signal for the gate line at the n-th row, Vpixel is a signal applied on the pixel electrodes of the sub-pixel at the n-th row, Vcom is a signal applied on a common electrode on the color filter substrate, and Ebar is a voltage difference formed by the signal applied on the first strip-like electrode and the second strip-like electrode on the color filter substrate.

The signal applied to the pixel electrode over a data line is referred to as Vpixel, which is the signal controlling display of a picture directly. Before the data signal on the data line for a frame of picture arrives, the voltage on the gate line for a row of sub-pixel rises; for instance, for the sub-pixel of the n-th row, the time T1 when the signal $GATE_n$ on the gate line at the n-th row rises is earlier than the time when the signal on the data line arrives or is applied. From time T1, the thin film transistors of the sub-pixels at the n-th row are turned on; from time T3, the data signal is applied on the pixel electrodes. The process from the time when the data signal is applied to the pixel electrode to the time when the voltage of the pixel electrodes arise to Vpixel is quickly, on the order of sub-millisecond. This means that, after application of signal on the pixel electrode is accomplished, VLC is generated; under the action of VLC, the liquid crystal molecules begin to restore to the original state (for example, restore from the state shown in FIG. 1b to the state of FIG. 1a). The time needed for restoration of the liquid crystal molecules typically is very long, on the order of millisecond.

For example, a certain sub-pixel M in the sub-pixels at the n-th row corresponds to a black point in the N-th frame, and corresponds to a white point in the N+1-th frame. At time T1, $GATE_n$ becomes high level; at time T3, the signal on the data line is applied on the pixel electrode; the signal on the pixel electrode reaches the required voltage (that is, Vpixel) within the time on the order of sub-millisecond.

In the embodiment of the disclosed technology, at time T2 between time T1 and T3 (approximately 5 millisecond), the driving circuit 3 applies a signal to the first strip-like electrode and the second strip-like electrode, such that a horizontal electric field is formed between the first strip-like electrode and the second strip-like electrode.

Figure 6:
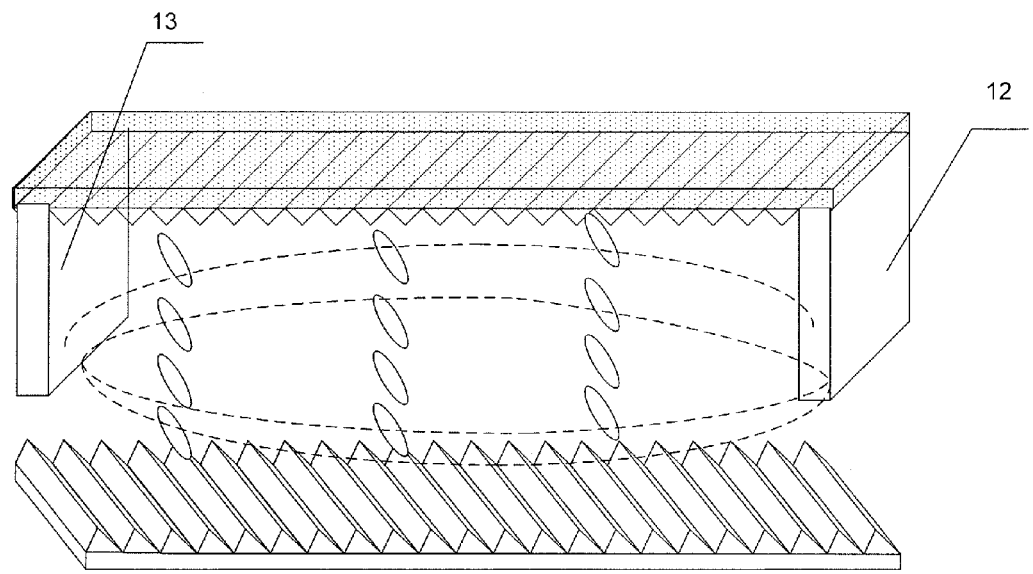
FIG. 6 is a schematic view of the deflection of the liquid crystal molecules under the action of a horizontal electric field formed by a first strip-like electrode and a second strip-like electrode in an embodiment of the disclosed technology.

Between time T1 and T2, VLC is not equal to zero, with the liquid crystal molecules at the state shown in FIG. 1b. After voltage difference "Ebar" is generated at time T2, the liquid crystal molecules deflect under the action of Ebar. Particularly, between time T2 and T3, for the sub-pixel M, the signal applied in the N-frame (corresponding to the lowest grey scale) still exists on the pixel electrode. Here, VLC and Ebar exist simultaneously, and Ebar and VLC may be at the same order of magnitude. In this way, the liquid crystal molecules are not in the state shown in FIG. 1b but at a certain pre-tilted angle under the cooperation of the perpendicular and the horizontal electric fields. FIG. 6 is a schematic view of the deflection of the liquid crystal molecules under the action of the horizontal electric field formed between a first strip-like electrode and a second strip-like electrode in an embodiment of the disclosed technology.

Figure 7:
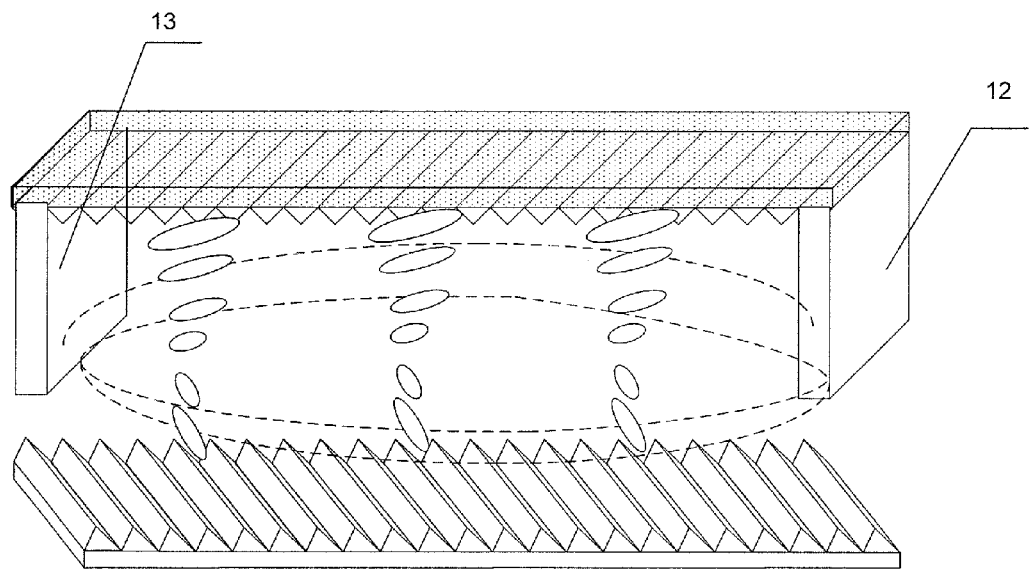
FIG. 7 is a schematic view of restoration of liquid crystal molecules to original state under the action of a horizontal electric field formed by a first strip-like electrode and a second strip-like electrode in an embodiment of the disclosed technology.

Between time T3 and time T5, for example, at time T4 the signal applied on the first strip-like electrode and the second strip-like electrode is stopped. At time T5, GATE$_n$ is switched to a low level, i.e., the thin film transistor of the sub-pixel of the n-th row is turned off. Between time T3 and time T4, VLC is zero (0). At this time, Ebar plays a primary role, and the liquid crystal molecules begin to restore to the original state under the dual action of Ebar and their elastic force, therefore the necessary time for the liquid crystal molecules restore to the original state can be decreased, i.e. Ton is decreased. Additionally, Ton is further decreased due to the pre-tilted angle that has been formed between time T2 and T3. FIG. 7 is a schematic view of restoration to original state of liquid crystal molecules under the application of a horizontal electric field formed between the first strip-like electrode and the second strip-like electrode in an embodiment of the disclosed technology. If the decrease coefficient due to the horizontal electric field formed between the first strip-like electrode and the second strip-like electrode to Ton is "k1," and the value of Ton is "P1" when the first strip-like electrode and the second strip-like electrode are not provided on the color filter substrate in a conventional technology, the value of Ton in the embodiment of the disclosed technology can be expressed as (1−k1)*P1.

Ebar may be a constant in the embodiment of the disclosed technology. In FIG. 5, the interval between time T2 and time T3 may be long for ensuring that the liquid crystal molecules are deflect to a pre-tilted angle sufficiently, approximately may be 3~5 milliseconds. The interval between time T3 and time T4 may be not too long, and preferably, not more than 1 millisecond, for avoiding impacting the electric field distribution in the liquid crystal layer for a long term and disadvantageous effect on the performance of grey scale for display. Since the interval between time T2 and T4 is short, Ebar may be selected as a bigger value in order to accelerate the restoration of the liquid crystal molecules, and this value may be at least three times of the value of VLC and therefore capable of creating an electric field strong enough to alter the electric field in the liquid crystal layer.

Figure 8:
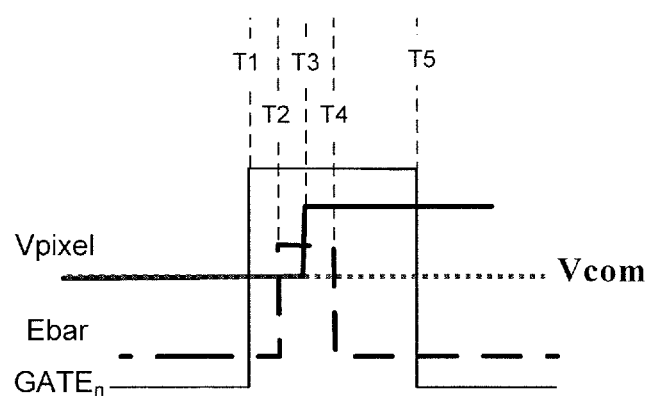
FIG. 8 is another sequence chart of each signal of the embodiment of the disclosed technology.

FIG. 8 is another sequence chart of each signal of an embodiment of the disclosed technology. The impact of the horizontal electric field formed between the first strip-like electrode and the second strip-like electrode on Toff will be analyzed with respect to FIG. 8. In FIG. 8, GATE$_n$ is the drive signal for the gate line at the n-th row, Vpixel is the signal applied on the pixel electrodes of the sub-pixel at the n-th row, Vcom is the signal applied on the common electrode on the color filter substrate, and Ebar is the voltage difference formed by the signal applied on the first strip-like electrode and the second strip-like electrode on the color filter substrate.

When a certain sub-pixel M in the sub-pixels at the n-th row corresponds to a white point (highest grey scale) in the N-th frame; and in the N+1-th frame, this sub-pixel M corresponds to a black point (lowest grey scale). At time T1, GATE$_n$ becomes high level. At time T3, the signal on the data line arrives and is applied on the pixel electrode, and the signal on the pixel electrode reaches the required voltage within the time on the order of sub-millisecond.

In the embodiment of the disclosed technology, at time T2 between time T1 and T3 (approximately 5 milliseconds), the driving circuit apply the signal to the first strip-like electrode and the second strip-like electrode.

Between time T1 and T2, VLC is zero and the liquid crystal molecules are in state shown in FIG. 1a. After the horizontal electric field between the first strip-like electrode and the second strip-like electrode is generated at time T2, this electric field would hinder the deflection of the liquid crystal molecules. Particularly, between time T2 and time T3, for the sub-pixel M, the signal applied in the n-th frame (corresponding to the highest grey scale) still exists on the pixel electrode. At this time, VLC is zero and liquid crystal molecules remain at original state (i.e., the state in FIG. 1a) under action of the perpendicular electric field VLC which is zero and the horizontal electric field Ebar which is not zero.

Between time T3 and time T5, for example, the signal applied on the first strip-like electrode and the second strip-like electrode stops at time T4. At time T5, GATE$_n$ switches to a low level, i.e., the thin film transistors of the sub-pixels at the n-th row are turned off. Between time T3 and time T4, VLC is not zero 0. At this time, the horizontal electric field between the first strip-like electrode and the second strip-like electrode and the perpendicular electric field between the transparent electrodes on the pixel electrode and the color filter substrate act together on the liquid crystal molecules, and the liquid crystal molecules begin to deflect under the dual action of the horizontal electric field and the perpendicular electric field. However, the horizontal electric field has effect of impediment on the deflection of the liquid crystal molecules in this process, which therefore increases the necessary time for the liquid crystal molecules deflect to the state shown in FIG. 1b, i.e., increases "Toff." If the increase coefficient of the horizontal electric field formed between the first strip-like electrode and the second strip-like electrode to Toff is "k2," and Toff is P2 when the first strip-like electrode and the second strip-like electrode are not provided on the color filter substrate in a conventional technology, the value of Toff in the embodiment of the disclosed technology is (1+k2)*P2.

As described above, the value of Ton in the embodiment of the disclosed technology is (1−k1)*P1 and the value of Toff in the embodiment of the disclosed technology is (1+k2)*P2. Thus, the response time of the liquid crystal display in the embodiment of the disclosed technology is (1−k1)*P1+(1+k2)*P2, while the response time is P1+P2 for the case when no first strip-like electrode and second strip-like electrode are provided on the color filter substrate in a conventional technology. As described above, VLC is equal to zero during the process of accelerating Ton (see time T3 to T4 in FIG. 5); VLC is not equal to zero during the process of slowing Toff down (see time T3 to T4 in FIG. 5) and Ebar has opposite function to VLC. Therefore, Ebar has bigger effect on Ton than Toff, which causes k1 greater than k2. Additionally, for a TN-type liquid crystal display, generally P1 is greater than P2. Therefore, (1−k1)*P1+(1+k2)*P2 in the embodiment of the disclosed technology is smaller than P1+P2.

It can be seen from the analysis above, in the TFT-LCD provided by the embodiment of the disclosed technology, a first strip-like electrode and a second strip-like electrode are provided in an area of black matrix on a color filter substrate, with the first strip-like electrode and the second strip-like electrode being electrically insulated to each other. Thus, when signals are applied on the first strip-like electrode and the second strip-like electrode, a horizontal electric field can be formed between the first strip-like electrode and the second strip-like electrode, which can decreases the response time of the liquid crystal display.

Therefore, the TFT-LCD of the embodiment of the disclosed technology decreases the response time of the liquid crystal display without providing alignment layers with various directions to form a relatively big pre-tilted angle, has a simple structure and a simple manufacture process.

In the TFT-LCD of the embodiment of the disclosed technology, farther a kind of elastic supporting material may be coated on the first strip-like electrode and the second strip-like electrode, such that the first strip-like electrode and second strip-like electrode can not only generate a horizontal electric field but also each act as a spacer.

TFTs are formed on an array substrate of the liquid crystal display, which have a certain height. Furthermore, the elastic supporting material coated on the first strip-like electrode and the second strip-like electrode would contract when compressed. A certain contraction coefficient exists, which may be determined according to the specific material, for example may be 0.8. Thus, based on this, the height of the first strip-like electrode and the second strip-like electrode may be equal to the distance between the substrates minus the height of TFT on the array substrate and further a product of multiplying the thickness of the elastic supporting material by the contraction coefficient of the elastic supporting material.

An embodiment of the disclosed technology provides a manufacturing method of the TFT-LCD, and the method comprises the step of forming a color filter substrate, including forming a first strip-like electrode and a second strip-like electrode in the area of black matrix.

Additionally, after the first strip-like electrode and the second strip-like electrode are formed, a black matrix is formed on the substrate.

Additionally, after the black matrix is formed, a color filter film is formed on the substrate, and after that a transparent electrode is formed on the substrate.

The manufacturing method of TFT-LCD provided by the embodiment of the disclosed technology comprises the step of forming a color filter substrate, which comprise:

Step 201, depositing metal film on a base substrate to form a first strip-like electrode and a second strip-like electrode in the area of a black matrix to be formed.

In an example, the base substrate is first cleaned, and a layer of metal film which may be Cr or the like is deposited on the substrate. Then the base substrate is cleaned again. A layer of photoresist is applied on the metal film and exposed by using a mask plate to obtain a photoresist pattern, then the metal film is etched with the photoresist pattern to form the first strip-like electrode and the second strip-like electrode.

Step 202, forming a black matrix on the substrate after step 201.

In an example, the base substrate after step 201 is cleaned, and then a material of photosensitive resin which contains black paint is formed on the base substrate, exposed with a mask plate, and developed to form a black matrix.

Step 203, forming a color filter film on the base substrate after the step 202.

In an example, the base substrate after the step 202 is cleaned, a red filter film is formed on the substrate; next, the substrate is cleaned again, and a green filter film is formed on the substrate; then, the substrate is again, and a blue filter film is formed on the substrate.

Step 204, forming a transparent electrode on the substrate after the step 203.

In an example, the base substrate after the step 203 is cleaned, and an overcoat layer (not shown) is formed on the substrate; a layer of transparent conductive film, for example, indium tin oxide (ITO) film, is deposited on the base substrate; with a patterning process with a mask late, the layer of transparent conductive film is patterned to form transparent electrodes.

For the TFT-LCD shown in FIG. 3, after the step 204, the method may further comprise the step of forming spacers. Additionally, according to the embodiment of the disclosed technology, a layer of elastic supporting material may be deposited in the step 201 after the first strip-like electrode and the second strip-like electrode are formed on the base substrate, such that the elastic supporting material covers on the first strip-like electrode and the second strip-like electrode, thus those electrodes may also function as spacers. Alternatively, the elastic supporting material may be a resin-type material and is applied to cover the first strip-like electrode and the second strip-like electrode using a deposition process. In the above embodiment, when the layers are subject to respective pattern processes, the first strip-like electrode and the second strip-like electrode are exposed, if necessary.

Another embodiment of the disclosed technology provides a driving method of the TFT-LCD of one of the embodiments of the disclosed technology, and the method comprises the following steps.

Step 101, after a thin film transistor of a sub-pixel area is turned one and before a data signal is applied on a pixel electrode of the sub-pixel area, applying signals to the first strip-like electrode and the second strip-like electrode, such that a horizontal electric field is formed between the first strip-like electrode and the second strip-like electrode.

Step 102, after applying the data signal to the pixel electrode and before the thin film transistor of the sub-pixel area is turned off, stopping the signals applied on the first strip-like electrode and the second strip-like electrode.

In step 101, voltage difference between the first strip-like electrode and the second strip-like electrode may be more than three times of the value of VLC.

By taking into account the impediment effect of the horizontal electric field between the first strip-like electrode and the second strip-like electrode on Toff, an overdrive way may be used to decrease this impediment effect, i.e., after applying the data signal on the pixel electrode and before turning off the thin film transistor of the sub-pixel area, the perpendicular electric field is increased such that VLC is greater than Ebar in this time period; while after turning on the thin film transistor of the sub-pixel area and before applying the data signal to the pixel electrode, Ebar become more than three times of the value of VLC. In an example, Ebar applied between time T1 and T3 is three times of the value of VLC, meanwhile between time T3 and T4, VLC is 1~2 times of Ebar.

In the driving method of the TFT-LCD provided by the embodiment of the disclosed technology, after applying the data signal on the pixel electrode and turning off the thin film transistor of the sub-pixel area, a driving circuit applies signals to the first strip-like electrode and the second strip-like electrode, such that a horizontal electric field is formed between the first strip-like electrode and the second strip-like electrode. The horizontal electric field formed in this phase can decrease Ton but can increase Toff. However, the decrease amount of Ton is larger than the increase amount of Toff. As a whole, the horizontal electric field formed between the first strip-like electrode and the second strip-like electrode can decrease the response time of liquid crystal display.

It may be understood by those skilled in the art that all of or part of the steps of the method above may be accomplished by means of program in hardware, software, firmware or the like. The aforementioned program may be stored in a computer readable storage medium. When being executed, the program executes the steps of the method of the embodiment; the above storage medium comprises various media, such as ROM, RAM, disc or CD etc, which may store program code.

The embodiment of the disclosed technology being thus described, it will be obvious that the same may be varied in many ways. Such variations are not to be regarded as a departure from the spirit and scope of the disclosed technology, and all such modifications as would be obvious to those skilled in the art are intended to be included within the scope of the following claims.

What is claimed is:

1. A thin film transistor liquid crystal display (TFT-LCD), comprising:
    a color filter substrate,
    an array substrate, and
    a liquid crystal layer sandwiched between the color filter substrate and the array substrate,
    wherein a first strip-like electrode and a second strip-like electrode are completely formed in the area of a black matrix on the color filter substrate, an area surrounded by the first strip-like electrode and the second strip-like electrode comprises at least one sub-pixel area, and the first strip-like electrode and second strip-like electrode are electrically insulated from each other.

2. The TFT-LCD according to claim 1, wherein an elastic supporting material is provided on the first strip-like electrode and the second strip-like electrode, whereby the first strip-like electrode and the second strip-like electrode work as spacers between the color filter substrate and the array substrate.

3. The TFT-LCD according to claim 2, wherein a height of the first strip-like electrode and the second strip-like electrode is equal to a gap between the color filter substrate and the array substrate minus a height of TFTs on the array substrate and a product of multiplying a thickness of the elastic supporting material by a contraction coefficient of the elastic supporting material.

4. The TFT-LCD according to claim 1, wherein the first strip-like electrode comprises a first main portion and a plurality of first branch portions extending from the main portion,
    the second strip-like electrode comprises a second main portion and a plurality of second branch portions extending from the main portion,
    the first main portion of the first strip-like electrode and the second main portion of the second strip-like electrode are parallel to each other and provided alternatively in a first direction, and
    the first branch portions of the first strip-like electrode and the second branch portions of the second strip-like electrode are parallel to each other and provided alternatively in a second direction which intersects with the first direction.

5. The TFT-LCD according to claim 1, further comprising a driving circuit which is connected with the first strip-like electrode and the second strip-like electrode, for applying signals to the first strip-like electrode and the second strip-like electrode after a thin film transistor of the sub-pixel area is turned on and before a data signal is applied to a pixel electrode of the sub-pixel area, such that a horizontal electric field is formed between the first strip-like electrode and the second strip-like electrode.

6. The TFT-LCD according to claim 5, wherein the driving circuit is further used for stopping signals on the first strip-like electrode and the second strip-like electrode after the data signal is applied on the pixel electrode and before the thin film transistor of the sub-pixel area is turned on.

7. A driving method of a thin film transistor liquid crystal display (TFT-LCD) according to claim 1, comprises:
    applying signals on the first strip-like electrode and the second strip-like electrode signal after the thin film transistor of the sub-pixel area is turned on and before a data signal is applied on the pixel electrode of the sub-pixel area, such that a horizontal electric field is formed between the first strip-like electrode and the second strip-like electrode; and
    stopping signals on the first strip-like electrode and the second strip-like electrode after the data signal is applied on the pixel electrode and before the thin film transistor of the sub-pixel area is turned off.

8. The driving method of TFT-LCD according to claim 7, wherein the voltage difference of the signals applied on the first strip-like electrode and the second strip-like electrode is more than three times of the voltage difference between a common electrode on the color filter substrate and the pixel electrode on the color filter substrate.

9. The driving method of TFT-LCD according to claim 7, wherein after the thin film transistor of the sub-pixel area is turned on and before the data signal is applied on the pixel electrode, the voltage difference of the signals applied on the first strip-like electrode and the second strip-like electrode is more than three times of the voltage difference between the common electrodes on the pixel electrode and the color filter substrate; after applying data signal on the pixel electrode and turning off the thin film transistor of the sub-pixel area, the voltage difference between a common electrode on the color filter substrate and the pixel electrode on the array substrate is greater than the voltage difference of the signals applied on the first strip-like electrode and the second strip-like electrode.

* * * * *